S. W. KREBS.
BREAD BOX.
APPLICATION FILED FEB. 5, 1917. RENEWED MAR. 11, 1918.

1,285,743.

Patented Nov. 26, 1918.

WITNESS:

INVENTOR
Stanley W. Krebs —
BY
Augustus B. Stoughton
ATTORNEY.

UNITED STATES PATENT OFFICE.

STANLEY WALTER KREBS, OF NEW YORK, N. Y.

BREAD-BOX.

1,285,743.　　　　　Specification of Letters Patent.　　Patented Nov. 26, 1918.

Application filed February 5, 1917, Serial No. 146,595. Renewed March 11, 1918. Serial No. 221,869.

*To all whom it may concern:*

Be it known that I, STANLEY WALTER KREBS, a citizen of the United States, residing at New York city and State of New York, have invented certain new and useful Improvements in Bread-Boxes, of which the following is a specification.

The principal objects of the present invention are to facilitate and make convenient the operation of cutting bread; to provide for automatically collecting the crumbs, and to provide a single unit for keeping bread and the knife to cut it with and for cutting the bread and for collecting and storing the crumbs.

Stated generally the invention comprises a bread box having on the outer surface of its lid a permanent bread board and a detachable crumb catcher adapted to receive crumbs from the board by the opening of the lid and to store the same so that they can be removed in the crumb catcher. The invention also, in addition, comprises the provision of a knife holder in connection with the crumb catcher, and the invention further comprises the improvements to be presently described and finally claimed.

Among the embodiments of the invention I have selected one for illustration in the accompanying drawings, in which—

Figure 1:
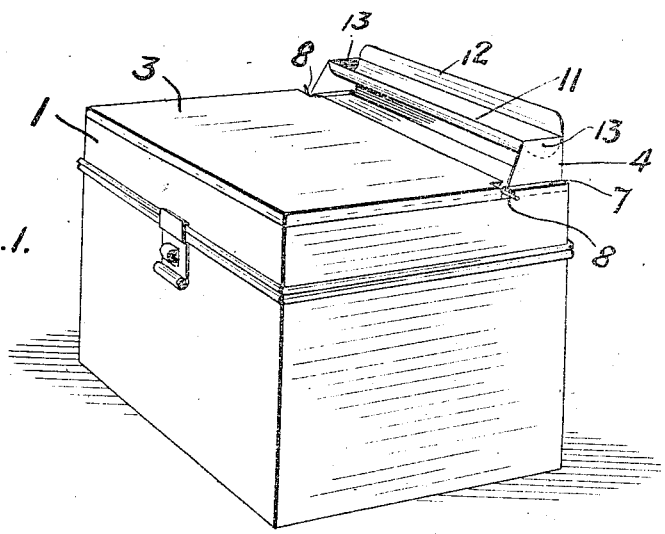
Figure 1, is a perspective view of a bread box embodying features of the invention.
Figure 2:
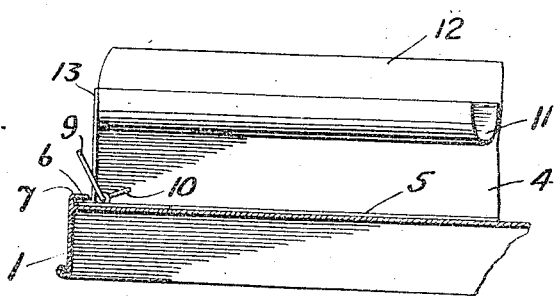
Fig. 2, is a sectional view, drawn to an enlarged scale, and illustrating a part of the crumb catcher and knife holder and also a part of the lid of the box.
Figure 3:
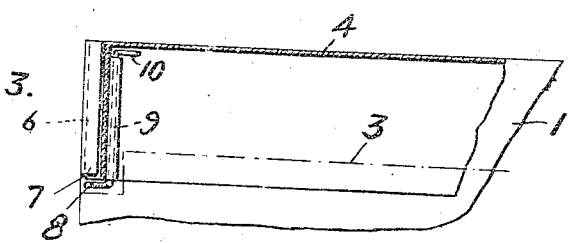
Fig. 3, is a top or plan view, partly in section, of the structure shown in Fig. 2, and Fig. 4, is a transverse sectional view illustrating the crumb catcher and a part of the bread board.
Figure 4:
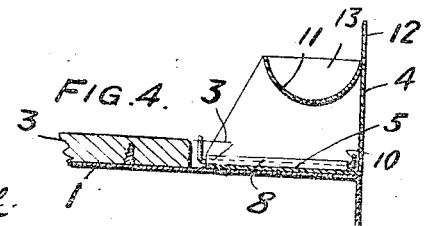

In the drawings 1 is the lid of a bread box and it is appropriately hinged at the end 2, Fig. 4, to the back of the box. 3, is a bread board shown as rectangular or it may be of other shape. This bread board 3 covers a portion of the outside of the lid and is permanently secured thereto in any appropriate manner. 4, is a crumb catcher and generally stated it consists of a box open at one side. The floor 5 of the box constituting the crumb catcher is adapted to occupy the portion of the lid 1 which is not covered by the bread board 3 and it extends forward so as to underlie the adjacent edge of the bread board 3, which may be beveled or cut away for its reception, as shown in Fig. 4. Thus the edge of the board 3 overlies the floor of the crumb catcher for a purpose that will appear from the following description. 6, are flanges extending beyond the end walls of the box that constitute the crumb catcher and they are adapted to slide under rails 7 carried by the lid 1. 8 are fastening devices for preventing accidental detachment of the crumb catcher. They are shown to consist of one of the upturned ends of a wire 9, pivotally connected with the floor of the crumb catcher and having the other upturned end 10 thereof adapted to operate as a limit stop. The upturned end 8 by engaging and disengaging the end of the rail 7 serves to prevent accidental detachment of the crumb catcher. The curved plate 11 which forms the top of the box, that constitutes the crumb catcher, in connection with prolongations 12 and 13 of the back and end walls constitutes a receptacle for the bread knife.

In use a loaf of bread, usually kept in the box, can be cut on the bread board 3 and for this purpose it is convenient to keep a knife in the knife holder 11. After having cut slices from the loaf of bread, it is returned to the bread box and in opening the lid for this purpose crumbs fall by gravity and automatically into the crumb catcher 4. The overlapping arrangement of the bread board in respect to the floor of the crumb catcher insures the crumbs reaching the crumb catcher. The prolongations 12 and 13 prevent the knife from accidentally falling out of the knife holder when the lid is opened. When a sufficient number of crumbs have accumulated in the crumb catcher it can be detached by properly manipulating the catches 8 and sliding it from beneath the rails 6. The crumbs in the crumb catcher can then be deposited in any suitable receptacle or otherwise disposed of. In addition to the advantages which will appear from the foregoing description attention may be called to the fact of the convenience of having all the things necessary for cutting bread in one place.

It will be obvious to those skilled in the art to which the invention relates that modifications may be made in details of construction and arrangement, so that the invention is not limited as to those matters.

What I claim is:

1. A bread box provided on the outer surface of its hinged lid with a bread board and with a detachable crumb catcher adapted to receive crumbs from the bread board as the lid is opened.

2. A bread box provided on the outer surface of its hinged lid with a bread board, and with a detachable crumb catcher the floor of which underlies the adjacent edge of the board, substantially as described.

3. A bread box provided on the outer surface of its hinged lid with a bread board and with a detachable crumb catcher provided with a knife holder, substantially as described.

4. In a bread box the combination of a marginally hinged lid provided with a bread board and with rails, a box-like structure open at one side and provided with flanges coöperating with said rails, and catches coöperating with the box-like structure and with the rails, substantially as described.

5. In a bread box the combination of a hinged lid provided with rails, a bread board applied to the lid, a box-like structure having flanges adapted to coöperate with said rails and open at one edge and provided with a curved top wall and prolonged side and end walls to constitute a knife holder, and catches for the box-like structure, substantially as described.

STANLEY WALTER KREBS.